United States Patent [19]

Nakagome et al.

[11] 4,090,222
[45] May 16, 1978

[54] FACSIMILE SIGNAL RECEPTION SYSTEM

[75] Inventors: Yukio Nakagome, Yokohama; Hiroichi Teramura, Tokyo; Yasuhiro Yamazaki, Hiratsuka; Yasushi Wakahara, Tokyo, all of Japan

[73] Assignee: Kokusai Denshin Denwa Kabushiki Kaisha, Japan

[21] Appl. No.: 732,600

[22] Filed: Oct. 15, 1976

[30] Foreign Application Priority Data

Oct. 16, 1975  Japan ............................... 50-124717

[51] Int. Cl.² .............................................. H06N 1/40
[52] U.S. Cl. .................................... 358/280; 358/261; 358/288
[58] Field of Search ................ 358/261, 288, 260, 280

[56] References Cited

U.S. PATENT DOCUMENTS

| 3,483,317 | 12/1969 | De Groat | 358/260 |
| 3,588,329 | 6/1971 | Monk | 358/260 |
| 3,622,695 | 11/1971 | Rugaber | 358/260 |
| 3,830,964 | 8/1974 | Spencer | 358/261 |
| 3,895,184 | 7/1975 | Komura | 358/260 |

Primary Examiner—Howard W. Britton
Attorney, Agent, or Firm—Robert E. Burns; Emmanuel J. Lobato; Bruce L. Adams

[57] ABSTRACT

A system for receiving an input facsimile signal sometimes added with dummy codes for each predetermined number of scanning lines by the use of a decoder for decoding the input facsimile signal for each information block of picture elements on the predetermined number of scanning lines. The number of bits of the input facsimile signal corresponding to the picture elements of the predetermined number of scanning lines is counted by a counter. When the count result of the counter is smaller than a reference bit number predetermined in consideration of the subscanning time of a receiver, the subscanning of the receiver is omitted. In this case, an operation of feeding a recording paper of the receiver may be effected.

4 Claims, 5 Drawing Figures

FACSIMILE SIGNAL RECEPTION SYSTEM

This invention relates to a facsimile signal reception system having the function of matching between a subscanning speed and a signal transmission speed.

In a coding system aimed at shortening of the time for transmission of facsimile signals, there occurs a phenomenon of mismatching between the subscanning speed and the transmission speed, that is, a phenomenon that since the code compression ratio is so high and the speed of subscanning involving a mechanical operation is lower than the coding or decoding speed, subscanning cannot follow up the coding speed. A conventional solution of this problem is to transmit a facsimile signal added with a dummy code, but has defects of increased capacity of a buffer memory and extended signal transmission time.

An object of this invention is to provide a facsimile signal reception system which is capable of matching between a subscanning speed and a signal transmission speed, with the capacity of a buffer memory reduced as much as possible and with the signal transmission time shortened as much as possible.

In the present invention, a small number of dummy codes or no dummy code are added to a facsimile signal and, at the receiving side, when the subscanning cannot follow up the docoding of received codes, decoding is achieved by a high-speed electronic circuit operation to maintain the synchronization of each scanning circuit, but subscanning of recording and paper feeding is omitted. Moreover, the property is utilized that the time necessary for paper feeding alone is shorter than that for paper feeding accompanied by recording, so that in such a case where the picture elements included in the scanning line are all white, only the paper feeding operation is effected at the receiving side without achieving a normal recording (development, fixing) process, thereby providing for further shortened transmission time.

Figure 1:
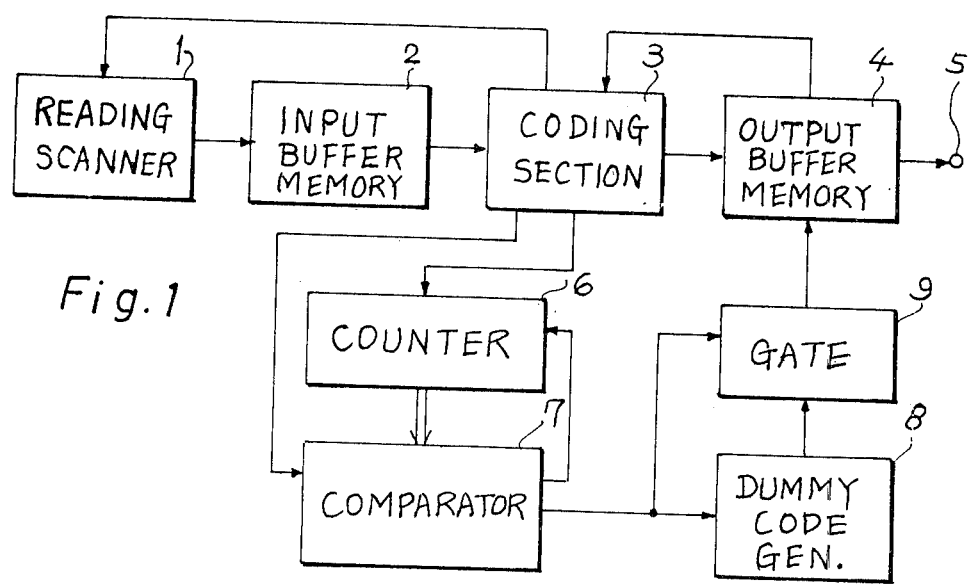
FIGS. 1 and 4 are block diagrams each illustrating an example of the transmitting side for developing a facsimile signal to which this invention is applied.

A description will be given first in connection with the transmitting side of the facsimile signal for which this invention is intended. FIG. 1 illustrates an embodiment of the transmitting side. Reference numeral 1 indicates a reading scanner for reading out facsimile signals from an original picture or the like to be transmitted by variable-speed subscanning; 2 designates an input buffer memory having a capacity of several scanning lines for temporarily storing the read-out facsimile signals; 3 identifies a coding section for sequentially coding the facsimile signals stored in the input buffer memory 2 into, for example, run lengths of known techniques; 4 designates an output buffer memory for storing the facsimile signals encoded by the coding section 3 and delivering out the same to an output terminal 5 at a constant bit rate; and 6 represents a counter for counting the number of coded bits derived from the coding section 3. Reference numeral 7 shows a comparator which upon completion of coding of the facsimile signals of a predetermined number ($x$) of scanning lines, compares the content of the counter 6 with a predetermined number, and then resets the counter 6 to zero, and if the content of the counter 6 is smaller than the predetermined number (which will hereinafter be taken as $y$), the comparator 7 applies a number of pulses corresponding to a difference between the compared values to a dummy code generator 8 and a gate 9 described later. Reference numeral 8 refers to the dummy code generator which, at each input pulse from the comparator 7, delivers out bit by bit a predetermined pattern, for example, a train of "0," or dummy codes of a pattern which does not appear in the output of the coding section 3. Reference numeral 9 indicates the gate for writing the output from the dummy code generator 8 in the output buffer memory 4 by the output pulse of the comparator 7.

The operation of the embodiment shown in FIG. 1 is as follows: A facsimile picture is scanned by the reading scanner 1 for obtaining a facsimile signal of time series serial configuration, and this subscanning is achieved by variablespeed driving. The facsimile signal of each scanning line read out by the reading scanner 1 is temporarily stored in the input buffer memory 2. When the amount of information stored in the output buffer memory 4 has been reduced to, for example, one bit, the coding section 3 immediately operates to complete one coding operation, for example, one run length coding operation in the run length coding, before the amount of information stored in the output buffer memory 4 is reduced to zero bit, and then delivers out the result of the operation to the output buffer memory 4. The number of coded bits of the output from the coding section 3, in this case, is counted by the counter 6. Further, the coding section 3 applies a pulse to the reading scanner 1 at each completion of coding of the information of each scanning line, and the reding scanner 1 reads out information of one scanning line from the original picture. Moreover, the coding section 3 applies one pulse to the comparator 7 at each completion of coding of facsimile signals of a predetermined number (a number such, for example, as one, two, four, eight, ..., which has already been indicated by $x$) of scanning lines. When the pulse is applied from the coding section 3 to the comparator 7, the latter compares the content of the counter 6, i.e. the number of output bits coded till then, with the predetermined number $y$. As a result of the comparison operation, if the content of the counter 6 (which content will hereinafter be referred to as Z) is larger than the predetermined number, that is, $Z \geq y$, the counter 6 is cleared to zero. However, if the content of the counter 6 is less than the predetermined number, that is, $Z < y$, the comparator 7 supplies pulses equal in number to the difference ($y-Z$) to the dummy code generator 8 and the gate 9. The dummy code generator 8, at each input thereto of one pulse, generates bit by bit a predetermined pattern, for example, a train of "0," or codes which do not appear at the output of the coding section 3. The predetermined number $y$, which is compared with the content of the counter 6 in the comparator 7, is a number which is determined by the subscanning time of a receiver (which subscanning time is equal to the time from the start of the operation to the completion of one subscanning such as recording, paper feeding, etc.) and the transmission bit rate. The number $y$ is equal to the number of transmission bits which are transmitted during the period of time necessary for completing subscanning at the receiver by a number of scanning lines from the start of the operation to the time when the coding section 3 applies a pulse to the comparator 7. This is expressed by the following equation:

$$y = x \times \text{(time necessary for one subscanning)} \times \text{(bit rate)} \quad (1)$$

In the circuit of FIG. 1, if the predetermined number $y$ to be compared with the content of the counter 6 in the comparator 7 is selected to be smaller than the value of the right side of the equation (1) ($x \times$ (time necessary for one subscanning) $\times$ (bit rate)), the number of dummy codes can be decreased. Especially, if it is assumed that $y=0$, no dummy code is generated. In such a case, subscanning at the receiving side sometimes cannot follow up decoding. The following description will be made with regard to a solution of the present invention for this problem.

Figure 2:
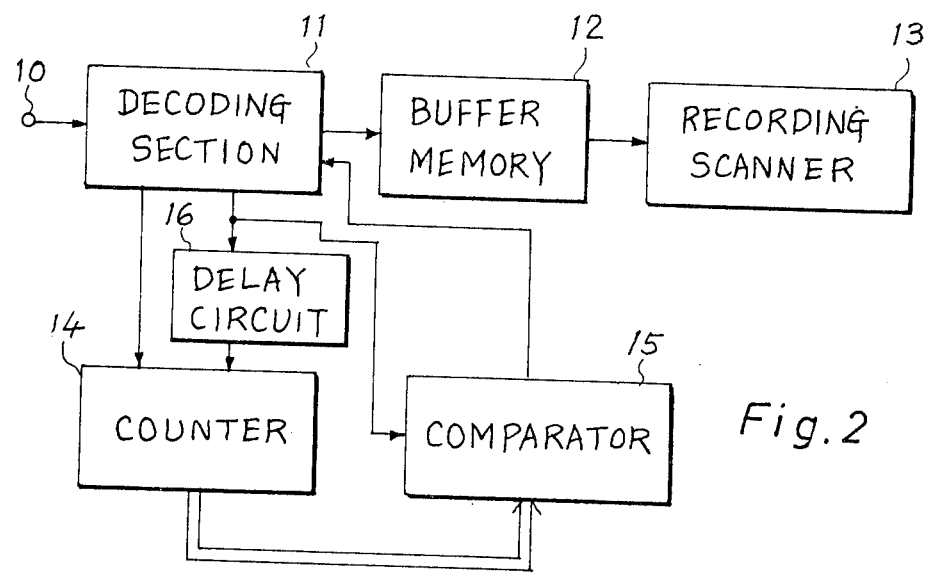
FIGS. 2 and 5 are block diagrams illustrating an embodiments of this invention for receiving facsimile signals respectively generated by the examples shown in FIGS. 1 and 4.

FIG. 2 shows in a block form an example of this invention. Reference numeral 10 indicates a facsimile signal input terminal; 11 designates a decoding section for decoding a coded facsimile signal; 12 identifies a buffer memory for temporarily storing the decoded facsimile signal; 13 denotes a recording-scanning section for scanning and recording the content of the buffer memory 12 on a record paper; 14 represents a counter for counting the number of input bits from the input terminal 10, which counter is cleared to zero by a pulse applied from the decoding section 11 each time when the decoding section 11 decides completion of a predetermined number of scanning lines, that is, $x$ scanning lines. Reference numeral 15 shows a comparator which compares the content of the counter 14 with a predetermined number immediately before the content of the counter 14 is cleared to zero, and when the content of the counter 14 is smaller than the predetermined number, the comparator 15 supplies pulses corresponding in number to the difference to the decoding section 11; and 16 refers to a delay circuit having a delay time corresponding to the time of one bit.

The operation of the embodiment shown in FIG. 2 is as follows: The coded facsimile signal is applied through the input terminal 10, and is immediately decoded in the decoding section 11. The decoded signal is temporarily stored in the buffer memory 12, and then recorded on the record paper in the recording-scanning section 13 at each completion of decoding of each scanning line. On the other hand, when a dummy code is included in the received facsimile signal, the number of bits of the dummy code is detected by the comparator 15 as described later and, in the decoding section 11, the received signal corresponding to the detected number of bits is eliminated. The counter 14 counts the number of bits of the facsimile signal from the input terminal 10. After decoding facsimile signals of the predetermined $x$ scanning lines, the decoding section 11 generates a pulse to the comparator 15. When the pulse is applied to the comparator 15, the latter compares the count value $Z'$ (the value of $Z'$ being equal to the value of above-mentioned $Z$) of the counter 14, i.e. the number of coded bits received till then, with the predetermined number $y$. Where the count value $Z'$ of the counter 14 is smaller, that is, in the case of $Z' < y$, the comparator 15 applies pulses corresponding in number to the difference $(y - Z')$ to the decoding section 11, indicating the presence of the dummy code. In the decoding section 11, while it is receiving pulses from the comparator 15, the facsimile signals applied through the input terminal 10 are eliminated as dummy codes. In the case of $Z' \geq y$, no dummy code is included in the facsimile signal, so that the comparator 15 generates no pulse. The counter 14 is cleared to zero immediately after the comparator 15 starts its operation. Further, the counter 14 does not count any dummy codes.

The predetermined number $y$, which is compared with the content of the counter 14 in the comparator 15, is equal to $y$ which is determined on the transmitting side. This enables that the dummy codes added at the transmitting side can be removed in proper quantities. At this time, recording-scanning cannot follow up decoding in some cases, since the speed of the recording-scanning section 13 is limited. In such a case, writing in the buffer memory 12 is interrupted to skip the subscanning operation. In other words, the content $Z'$ of the counter 14 is compared in the comparator 15, with the aforesaid number $y$ to obtain the number of bits $(y - Z')$ of the dummy code, thereby to detect the dummy code. At the same time, it is watched whether or not the buffer memory 12 overflows. If the buffer memory 12 overflows, the information, for example, of the scanning lines written therein is cleared out therefrom and then the result of decoding of the next scanning line is stored. In this case, however, the information, which is cleared out, is the information of scanning lines equal in number to an integer (assumed to be $w$) obtained by raising to unity fractions below the decimal point of, for example, the following value:

$$\frac{y - z'}{\text{(time for one subscanning)} \times \text{(bit rate)}} \quad (2)$$

and it is assumed that the abovesaid information corresponds to $w$ scanning lines written latest. In accordance with the above operation, the number of bits of the dummy code is detected, so that synchronization of each scanning line can be maintained, and recording is omitted for the full length of the scanning line.

Figure 3:
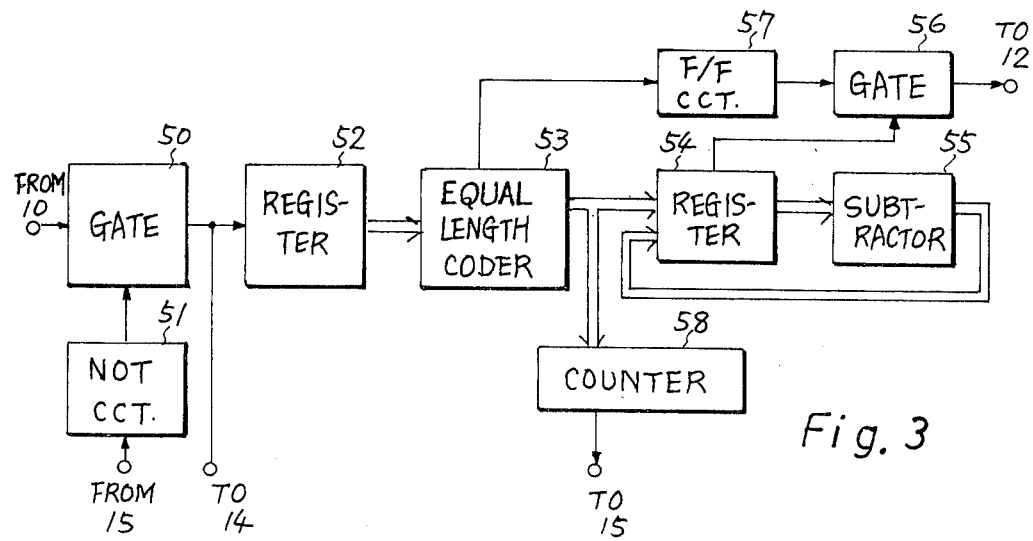
FIG. 3 is a block diagram illustrating an example of a decoding section for use in the embodiment shown in FIG. 2.

FIG. 3 illustrates an example of the decoding section 11 shown in FIG. 2. Reference numeral 50 indicates a gate; and 51 designates a NOT circuit for producing an output of negation of the output from the comparator 15 to inhibit the passage of a dummy code through the gate 50. Reference numeral 52 identifies a register; 53 denotes a signal converter (hereinafter referred to an equal-length coder), in which an input variable length code is converted into an equal length code. Reference numeral 54 identifies a register which temporarily stores the equal-length code from the equal-length coder 53, and applies a pulse to a gate 56 when the value of the equal length code is larger than zero. The value stored in the register 54 is applied to a subtractor 55, in which it is subtracted by one, and then written in the register 54 again. Accordingly, the register 54 and the subtractor 55 forms a decoder so that register 54 supplies to the gate 56 pulses equal in number to the value initially received from the equal-length coder 53. Reference numeral 57 shows a flip-flop circuit to which is applied a pulse from the equal-length coder 53 at each conversion from a variable length code to an equal length code in the equal-length coder 53, and whose output value is reversed from "1" to "0" or from "0" to "1" at each application of the abovesaid pulse. The value which is supplied from the equal-length coder 53 to the register 54 is a run length, and since the output from the flip-flop circuit 57 reverses at each run length, the information passing through the gate 56 becomes picture element information which is obtained by decoding the run length and delivered out to the buffer memory 12.

On the other hand, since a timing signal of the input signal having passed through the gate 50 is applied to the counter 14, the counter 14 can count the number of bits of the input signal. Reference numeral 58 indicates a counter, which integrates the output value of the equal-length coder 53, and, when the integrated value becomes equal to the number of picture elements included in a predetermined number (for example, four) of scanning lines, the counter 58 applies a pulse to the comparator 15 and then clears out its count value to zero.

As described above, in the present invention, the number of bits of the facsimile signal, which is transmitted for the information of x scanning lines, is not always greater than the number of bits which are transmitted within the time necessary for the receiver to effect subscanning of the x scanning lines, although dummy codes are sometimes added to the facsimile signal. The buffer memory (12 in FIG. 2) of the receiver has a fixed capacity corrresponding, for example, to the x scanning lines and, as a result of this, the subscanning speed is low to introduce the likelihood of an overflow from the buffer memory (12 in FIG. 2). When the buffer memory overflows, a certain amount of information (corresponding, for example, to one scanning line) stored in the buffer memory is immediately discarded to avoid the overflow.

The conventional system is such that a received record identical with a transmitted picture is obtained on the receiving side. For realizing this by the facsimile transmission system involving data compression, a buffer memory and dummy codes are always required. However, the phenomenon where the compression ratio is raised high to reduce the number of coded bits to make it impossible that subscanning of the receiver cannot follow up decoding, occurs in the case of a scanning line having a very small amount of information on a facsimile picture, for example, a scanning line on which the picture elements included therein are all white. Even if subscanning is omitted for such scanning line to interrupt recording, the result is only a slight shrinkage of the white portion and the picture quality of the received picture is hardly degraded. In this case, however, it must be appreciated that synchronization of each scanning line is retained and that recording is omitted for the full length of the scanning line. With the use of the present system, facsimile signals can be transmitted by the use of a reduced number of dummy codes, or without using them ($y=0$), and accordingly the transmission time can be further shortened, and, moreover, such transmission can be realized by a very simple control.

Figure 4:
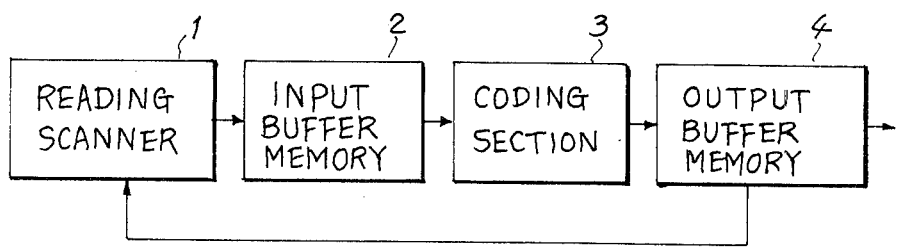

This invention is applicable to the reception of facsimile signals transmitted from transmitting stations of other types. FIG. 4 is a block diagram showing the transmitting side of other type. Reference numberal 1 indicates a reading scanner for reading facsimile signals by scanning; 2 designates an input buffer memory which stores the read facsimile signals, for example, for each line and has a capacity of two lines; 3 identifies a coding section for sequentially coding the facsimile signals stored in the input buffer memory 2 into, for instance, run lengths; and 4 denotes an output buffer memory which temporarily stores the coded facsimile signals for delivering out the same to a transmission line at a constant speed. Thus, the output buffer memory 4 is provided at the suceeding stage of the coding section 3 and, for example, a variable scanning speed system employing a pulse motor is used for subscanning drive at the transmitting side. With this system, in a case where the amount of information stored in the output buffer memory 4 exceeds a certain large reference value, subscanning at the transmitting side is interrupted to stop coding, and when the abovesaid amount of information decreases to be lower than a certan low reference value, subscanning is carried out to resume coding. Moreover, when the amount of information stored in the output buffer memory is reduced to zero, a dummy code is delivered out.

Figure 5:
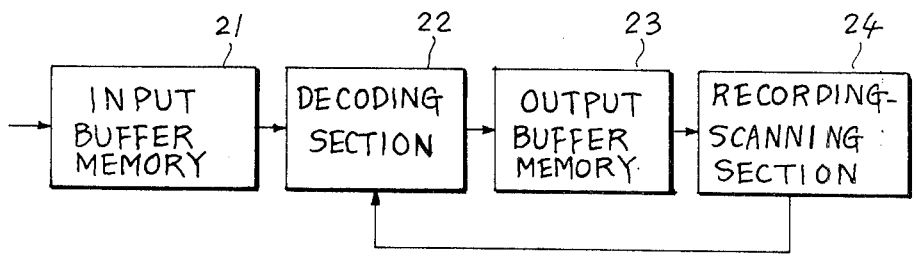

In FIG. 5, there is shown the construction of the receiving side of this invention for the facsimile signal in the case of transmitting information by the use of the transmitter depicted in FIG. 4. At the transmitting side of FIG. 4, for example, when the subscanning speed of the transmitting side is not so high, the capacity of the input buffer memory 2 is increased to prevent an underflow from the output buffer memory 4, so that the number of used dummy codes is reduced. At the receiving side of this invention in FIG. 5, the capacity of an input buffer memory 21 is reduced. In a case where subscanning of the record-scanning section is low so that an output buffer memory 23 overflows to cause the input buffer memory 21 to approach its full capacity, subscanning is immediately omitted, that is, the information in the output buffer memory 23 corresponding, for example, to one scanning line is eliminated. In this case, the operation of the decoding section is immediately started to decode the facsimile signal stored in the input buffer memory 21, thus avoiding an overflow of the input buffer memory 21. To realize this, it is sufficient only to add a mechanism of detecting an overflow from the input buffer memory 21, to clear the output buffer memory 23 in response to the overflow detection and to start the decoding operation.

Further, it is also possible to employ the following facsimile signal transmission system utilizing the fact that the time required for paper feeding alone is shorter than the time for subscanning accompanied by recording. That is, when scanning lines where the picture elements included therein are all white (which scanning lines will hereinafter be referred to as idle lines) are detected at the transmitting side, special idle codes are assigned to the idle lines to encode the number of successive idle lines, and, at the receiving side, when the idle code indicative of the number of idle lines is decoded, only paper feeding is carried out without involving recording. This paper feeding does not cause degradation of the picture quality of the recorded picture. With such a control operation, the time necessary for paper feeding alone (which time is taken as $T_p$ sec./line) is generally shorter than the time for subscanning involving recording (which time is taken as $T_y$ sec/line), so that the number of dummy codes to be added can be reduced. Namely, the number of bits of the dummy codes to be added when the number of succeeding idle lines (which number is taken as $i$) is encoded, is as follows:

$i \times T_p$ — (number of bits required for encoding idle lines).

Moreover, the number of bits of dummy codes when such a control operation is not achieved is as follows:

$i \times T_v$ — (number of bits required for encoding idle line).

Accordingly, the number of dummy codes is reduced by $i \times (T_v - T_p)$ bits, providing for shortened transmission time.

The paper control operation described above can be realized by using substantially the same construction as shown in the block diagrams of FIGS. 1 and 2. However, it is not always at each completion of the predeterermined number $x$ of scanning lines that the coding section 3 in FIG. 1 and the coding section 11 in FIG. 2 respectively apply pulses to the comparators 7 and 15 but, in the case of idle lines existing, above pulse application is carried out at each completion of the immediately preceding scanning line and at the time of completion of the successive idle lines. As a result of this, the predetermined number $y$ employed for comparison is altered as follows:

(i) For the scanning lines which are not idle lines, $y =$ number of scanning lines $\times$ bit rate $\times T_v$, (ii) For the scanning lines which are idle lines, $y =$ number of scanning lines $\times$ bit rate $\times T_p$, In a case where the time required only for paper feeding is longer than the time for recording, it is possible, of course, to employ the control operation in which paper feeding is omitted and recording is effected, for example, twice, on the scanning lines of the same receiving paper.

The foregoing description is premised on the control of feeding the paper line by line as subscanning driving, for example, on the control by a step motor. However, it is also possible, of course, to achieve paper feeding in blocks of a plurality of lines by the use of, for example, a DC motor. In such a case, the abovesaid value of $y$ (ii) for the number of idle scanning lines is changed as follows:

$y =$ bit rate $\times$ (time necessary for paper feeding corresponding to those idle lines).

Of course, it is possible to combine the paper feeding control for idle lines, described above, with the control operation of omitting subscanning when subscanning does not follow up decoding. Thus, it is possible to decrease the number of dummy codes and the number of idle scanning lines to be omitted.

As has been described in detail in the foregoing, this invention is simple in control, and hence can be realized with simple circuitry. Further, a required amount of memories is also small, and the transmission time can be shortened.

What we claim is:

1. A system for receiving an input facsimile signal, sometimes with dummy codes added for each predetermined number of scanning lines, comprising:

input terminal means for receiving said input facsimile signal;

decode means connected to said input terminal means for decoding said input facsimile signal for each information block of picture elements on the predetermined number of scanning lines;

count means connected to said decode means for counting the number of bits of the input facsimile signal corresponding to the picture elements of the predetermined number of scanning lines;

a receiver connected to said decode means for providing a record on a record medium in response to the decoded output of said decode means; and control means connected to said decode means and said count means for omitting subscanning of said receiver when the count determined by said count means is smaller than a reference bit number predetermined in consideration of the subscanning time of said receiver.

2. A system for receiving an input facsimile signal according to claim 1, in which said control means comprises a comparator connected to said decode means and said count means for comparing the count result of said count means with said reference bit number provided therein to develop a control signal when the count result of said count means is smaller than said reference bit number, said decode means eliminates the input facsimile signal during the duration of said control signal.

3. A system for receiving an input facsimile signal according to claim 2, in which said decode means comprises a first gate connected to said input terminal means and said comparator to pass therethrough said input facsimile signal except for the duration of said control signal, signal conversion means connected to said first gate for converting the output of said first gate to constant length codes indicative of run-lengths of white or black, a flip-flop circuit connected to said signal converter to establish one of two possible states respectively indicative of white and black of each of said run lengths, a decoder connected to said signal converter to decode each of said constant length codes to pulses equal in number to the value of the decoded constant length code, and a second gate connected to said flip-flop circuit and said decoder for gating said pulses from said coder in accordance with the established state of said flip-flop circuit.

4. A system for receiving an input facsimile signal, sometimes with dummy codes added for each predetermined number of scanning lines and including idle codes each indicative of a number of idle lines, comprising:

input terminal means for receiving said input facsimile signal;

decode means connected to said input terminal means for decoding said input facsimile signal for each information block of picture elements on the predetermined number of scanning lines;

count means connected to said decode means for counting the number of bits of the input facsimile signal corresponding to the picture elements of the predetermined number of scanning lines;

a receiver connected to said decode means for providing a record on a record medium in response to the decoded output of said decode means; and control means connected to said decode means, said count means and said receiver for effecting feeding of the recording medium of said receiver when the count determined by said count means is smaller than a reference bit number predetermined in consideration of the subscanning time of said receiver.

* * * * *